United States Patent

Schön

[11] Patent Number: 5,233,720
[45] Date of Patent: Aug. 10, 1993

[54] SNAP-FITTING SHIELD FOR A WINDSHIELD WIPER ARM

[75] Inventor: Wilfrid Schön, St. Etienne/Usson, France

[73] Assignee: Valeo Systemes d'Essuyage, Montigny-Le-Bretonneux, France

[21] Appl. No.: 733,116

[22] Filed: Jul. 19, 1991

[30] Foreign Application Priority Data

Jul. 25, 1990 [FR] France ................. 90 09489

[51] Int. Cl.⁵ ................................. B60S 1/34
[52] U.S. Cl. ..................... 15/250.31; 15/250.34; 15/250.35; 403/10; 403/23
[58] Field of Search ............ 15/246, 250.34, 250.31, 15/250.35; 403/10, 23

[56] References Cited

U.S. PATENT DOCUMENTS

| | | | |
|---|---|---|---|
| 2,860,364 | 11/1958 | Krohm | 15/250.34 |
| 3,010,743 | 11/1961 | Bengston, Jr. | 403/10 |
| 3,769,654 | 11/1973 | Edele et al. | 15/250.34 |
| 4,497,084 | 2/1985 | Auzolot | 15/250.34 |
| 4,502,178 | 3/1985 | Ragot et al. | 15/250.34 |

FOREIGN PATENT DOCUMENTS

| | | | |
|---|---|---|---|
| 2206166 | 8/1972 | Fed. Rep. of Germany | 15/250.34 |
| 2511013 | 9/1976 | Fed. Rep. of Germany | 15/250.34 |
| 3123859 | 12/1982 | Fed. Rep. of Germany | 15/250.34 |
| 3532848 | 1/1987 | Fed. Rep. of Germany | 15/250.34 |
| 2195957 | 3/1974 | France . | |
| 2200815 | 4/1974 | France . | |
| 2462311 | 2/1981 | France . | |
| 2488842 | 2/1982 | France | 15/250.34 |
| 2607766 | 6/1988 | France | 15/250.35 |
| 2188537 | 10/1987 | United Kingdom | 15/250.34 |

*Primary Examiner*—Harvey C. Hornsby
*Assistant Examiner*—Gary K. Graham
*Attorney, Agent, or Firm*—Wenderoth, Lind & Ponack

[57] ABSTRACT

A windshield wiper has a wiper blade which is coupled to a drive head through a wiper arm having a shroud. A shield for protecting the drive head includes a hollow body extended by at least one securing arm, through which the shield is joined to the shroud while being able to slide with respect to the latter. The shield is joined to the shroud through two securing arms, each of which is formed with a longitudinal guide slot, with pins, carried by the shroud, engaging within such guide slots.

7 Claims, 1 Drawing Sheet

SNAP-FITTING SHIELD FOR A WINDSHIELD WIPER ARM

FIELD OF THE INVENTION

The present invention relates to windshield wipers for motor vehicles, and more particularly to a shield which can be snap-fitted onto a windshield wiper arm of the shrouded type, for protecting and concealing the drive head of the windshield wiper.

BACKGROUND OF THE INVENTION

It is known that for wiping glass surfaces which are subjected to rain or splashing, good visibility through the glass surfaces is ensured by the use of oscillating windshield wipers which rub against the swept surfaces with a wiper blade. The wiper blade is generally driven by a windshield wiper arm, which itself is mechanically fixed to a drive unit, generally consisting of an electric motor which communicates oscillating rotary motion through a reduction gear to the wiper arm. For this purpose, the drive unit has a drive spindle on which a drive head is mounted. The drive head is itself coupled to the wiper arm that carries the armature of the wiper blade.

The windshield wiper arm may have to be replaced due to wear or to some mechanical fault. Accordingly, it is usual to fit the drive head on the drive spindle by means of a disengageable fastening member such as a nut, which can be unscrewed so that the wiper arm can be separated from the drive spindle. In the interests of neat appearance, it is necessary that the securing means for the wiper arm should be hidden. In addition, it is desirable to protect this securing means against ingress of foreign matter, for example dirt. It is already known to achieve this by covering the nut with a removable shield, which should preferably be coupled to a shroud portion of the wiper arm in such a way that the shield cannot be lost, that is to say the shield should be able to be moved away from the coupling between the wiper arm and the output spindle so that the windshield wiper arm can if necessary be changed.

French published patent application FR 2 462 311A discloses an arrangement in which a shield is attached to a shroud through trunnions which are carried by the shield, and which are inserted in grooves provided in the shroud, in such a way that the shield can both pivot about the trunnions and be displaced by sliding movement along grooves formed in the shroud. With that arrangement, the shield which initially surrounds the drive head is first pivoted and then moved backwards, that is to say towards the wiper blade, so that access to the nut that secures the drive head on the drive spindle is obtained.

It has become apparent that the trunnions are quite fragile, so that they are liable to become damaged due to mishandling, thus necessitating the replacement of the entire arm. In addition, the cost of manufacture of such an assembly is quite high, having regard to the fact that it is necessary to form slideways in the shroud, the latter usually being made of sheet steel.

DISCUSSION OF THE INVENTION

An object of the present invention is to overcome the drawbacks of known protective shield arrangements, and to enable a shield of particularly simple construction to be locked on to the shroud with a snap-fit.

In accordance with the invention, a windshield wiper arm having a protective shield for a drive head of the wiper arm, the latter being connected to the drive head through a shroud, the shield comprising a hollow body extended by at least one securing arm coupling it to the shroud, so as to enable the shield to slide with respect to the shroud, is characterised in that the shield is coupled to the shroud through two such securing arms, each of which has a longitudinal guide slot, with pins carried by the shroud being engageable in the guide slots.

Further features and advantages of the invention will appear more clearly from a reading of the description which follows, and which relates to one particular preferred embodiment of the invention, given by way of example only and with reference to the accompanying drawings.

DESCRIPTION OF A PREFERRED EMBODIMENT OF THE INVENTION

Figure 1:
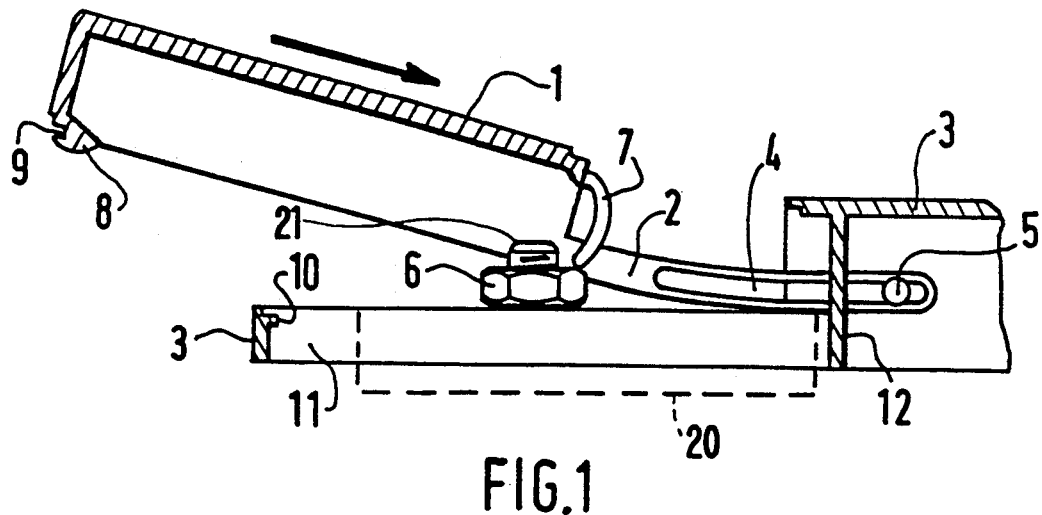
FIG. 1 is a sectional view of a protective shield shown in an extended position thereof for attachment to a shroud.

FIG. 1 shows the operation of fitting of a shield 1, which is seen in vertical cross section. In FIG. 1, it can be seen that the shield 1 consists of a hollow body, with two securing arms 2 at its inner end. Since FIG. 1 is a cross sectional view, only one of the arms 2 is visible. The arms 2 extend into a interior of the shroud, which is generally indicated by the reference numeral 3, of a windshield wiper arm carrying at its other end (not shown) a wiper blade. Each of the arms 2 has a guide slot 4, within which is engaged a pin or button 5 which is carried by, and projects inwardly from, the inner surface of the shroud 3.

The shroud 3 is preferably made by molding a plastics material, as in the shield 1. The inwardly curved shape of each arm 2 enables the shield 1 to pivot about the pins 5 in such a way as to clear, by such pivoting motion, the upper part of a nut 6 employed to secure a driving head, shown schematically at 20 in FIG. 1, to a drive spindle 21. The body of the shield 1 also has, on the same side as the shroud 3, a resilient means in the form of an inwardly curved resilient tongue 7, which projects out of the body of shield 1 across an opening formed in the shield.

At the opposite end from the tongue 7, the shield 1 has a flange 8 which is formed with a hook 9. This hook 9 is adapted to engage in a snap-fit manner over a bead 10 formed on the shroud 3, within a cavity 11 thereof in which the drive spindle, the drive head and the nut 6 are all received. The snap-fit means thus comprise the hook 9 defining a groove, formed in the flange 8 of the body 1 of shield and fitting around the bead 10, with the tongue 7 then exerting a lateral locking pressure on the hook 9 via the body of the shield 1.

Figure 2:
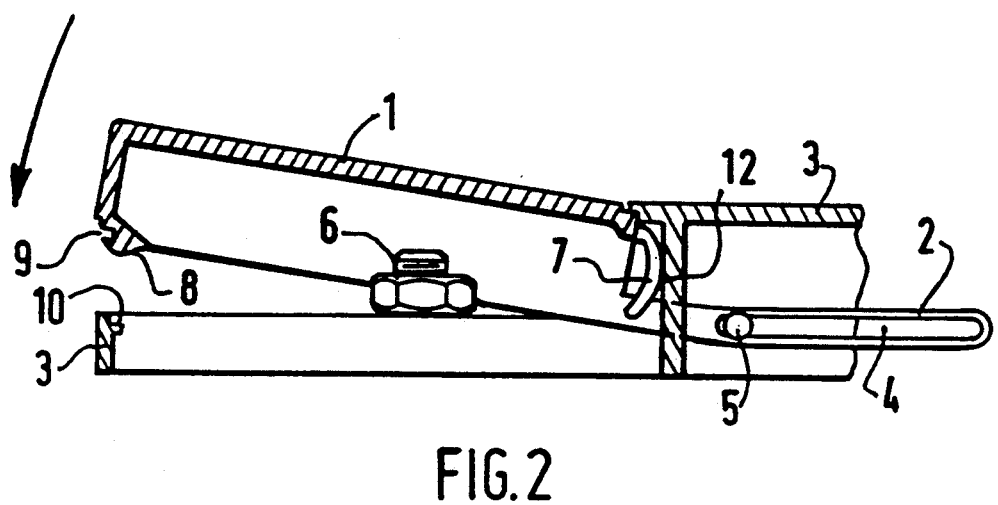
FIG. 2 is a similar of the shield immediately before being snapped into position.

As can be seen from FIG. 2, the operation of fitting the shield 1 over the drive head consists firstly in sliding the arms 2 on to the pins 5. The body of the shield 1 thus is brought both towards the shroud 3 and the nut 6 simultaneously. The resilient tongue 7 then comes into engagement against a vertical wall 12 of the shroud 3, against which it lightly presses. As can be seen from the drawings, the tongue 7 is curved inwardly in such a way as to slide against the wall 12.

Figure 3:
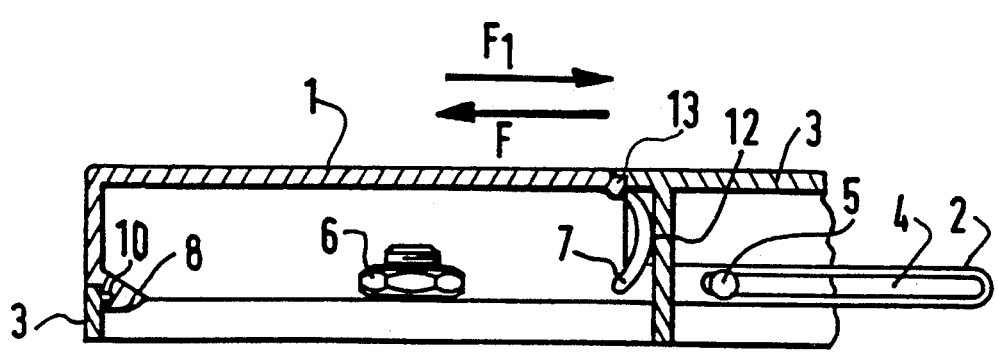
FIG. 3 is a similar view showing the shield in a position overlying an outer end of a drive spindle.

As the pivoting movement is continued (see FIG. 3), the flange 8 is passed over the bead 10, so that the hook 9 snaps into engagement with the bead 10. At this instant, the tongue 7 exerts a thrust from right to left (as seen in the Figure) as indicated by the arrow F, so that the hook 9 becomes applied laterally against the bead 10 and thereby provides a lock. Thus, the shield 1, fitted as has just been described, is prevented from being opened accidentally, and forms a compact unit with the shroud 3. The position of the shield 1 in the closed position is shown in FIG. 3.

By contrast, when access is required to the nut 6, a pressure applied in the direction indicated by the arrow F1 enables the hook 9 to be disengaged from the bead 10, so that the body of shield 1 can then be pivoted around an axis 13, and finally the guide slots 10 can be slid past the pins 5, until the position shown in FIG. 1 is reached. The body of shield 1 can then be rotated through an angle of about 90°, by rotation of the arms 2 about the pins 5, thus rendering the nut 6 fully accessible.

Numerous variants may of course be introduced, in particular by substitution of means that are technically equivalent, but without departing from the scope of the present invention. Thus for example, the resilient means may be formed on the wall of the shield that carries the locking means, and may consist of a resilient tongue projecting from that end wall of the shield.

What is claimed is:

1. A windshield wiper arm comprising:
   a shroud to be coupled to a drive head for driving the arm, said shroud having extending therefrom two pins;
   a shield including a body having extending therefrom two arms, each said arm having a longitudinal guide slot;
   said shield being mounted on said shroud by said pins of said shroud fitting into respective said slots in said arms of said shield, such that said shield is movable relative to said shroud between a closed position whereat said shield would cover the drive head and an open position whereat the drive head would be uncovered;
   said shield and said shroud including elements cooperatively engageable to form snap-fit means for maintaining said shield in said closed position relative to said shroud; and
   one of said shield and said shroud having thereon resilient means engaging the other of said shroud and said shield for urging said elements of said snap-fit means into cooperating engagement, said resilient means comprising a curved resilient tongue.

2. A windshield wiper as claimed in claim 1, wherein said tongue is carried by said shield.

3. A windshield wiper arm as claimed in claim 2, wherein said tongue resiliently presses against said shroud to thereby urge said shield away from said shroud.

4. A windshield wiper arm as claimed in claim 1, wherein said elements forming said snap-fit means comprise a hook removably engaging around a bead.

5. A windshield wiper arm as claimed in claim 4, wherein said hook is formed on said shield and said bead is formed on said shroud.

6. A windshield wiper arm as claimed in claim 5, wherein said hook is defined by a groove formed in a flange of said shield, and said bead fits within said groove.

7. A windshield wiper arm as claimed in claim 1, wherein said shield is movable relative to said shroud in a slidable manner over the length of said slots and in a pivotable manner about said pins.

* * * * *